United States Patent
Lin

(10) Patent No.: US 8,979,392 B2
(45) Date of Patent: Mar. 17, 2015

(54) PHOTOELECTRIC CONVERTER

(75) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 154 days.

(21) Appl. No.: 13/417,518

(22) Filed: Mar. 12, 2012

(65) Prior Publication Data

US 2013/0156373 A1   Jun. 20, 2013

(30) Foreign Application Priority Data

Dec. 19, 2011   (TW) .............................. 100147108 A

(51) Int. Cl.
G02B 6/32 (2006.01)
G02B 6/42 (2006.01)

(52) U.S. Cl.
CPC .................................. *G02B 6/4201* (2013.01)
USPC ............................................. 385/93; 385/33

(58) Field of Classification Search
USPC ....................................................... 385/93, 33
See application file for complete search history.

(56) References Cited

U.S. PATENT DOCUMENTS

| | | | |
|---|---|---|---|
| 5,245,680 A * | 9/1993 | Sauter | 385/24 |
| 6,328,484 B1 * | 12/2001 | Uebbing | 385/93 |
| 6,535,661 B2 * | 3/2003 | Takahashi et al. | 385/15 |
| 7,071,458 B2 * | 7/2006 | Tsukamoto et al. | 250/216 |
| 7,369,328 B2 * | 5/2008 | Yamamoto et al. | 359/726 |
| 7,404,679 B2 * | 7/2008 | Ebbutt et al. | 385/78 |
| 7,489,840 B2 * | 2/2009 | Sekiya et al. | 385/36 |
| 2002/0012489 A1 * | 1/2002 | Solgaard et al. | 385/18 |
| 2002/0012492 A1 * | 1/2002 | Takahashi et al. | 385/24 |
| 2004/0067015 A1 * | 4/2004 | Nakajima | 385/33 |
| 2004/0114881 A1 * | 6/2004 | Wilson | 385/89 |
| 2005/0218305 A1 * | 10/2005 | Tsukamoto et al. | 250/216 |
| 2006/0164738 A1 * | 7/2006 | Yamamoto et al. | 359/871 |
| 2006/0237402 A1 * | 10/2006 | Nagashima et al. | 219/121.63 |
| 2006/0239607 A1 * | 10/2006 | Yamamoto et al. | 385/16 |
| 2007/0140628 A1 * | 6/2007 | Ebbutt et al. | 385/89 |
| 2007/0237459 A1 * | 10/2007 | Watte et al. | 385/39 |
| 2009/0028575 A1 * | 1/2009 | Epitaux et al. | 398/139 |
| 2012/0008899 A1 * | 1/2012 | Morioka | 385/33 |
| 2012/0013894 A1 * | 1/2012 | Watte et al. | 356/73.1 |
| 2012/0224817 A1 * | 9/2012 | Hayashi | 385/93 |

* cited by examiner

*Primary Examiner* — Kaveh Kianni
(74) *Attorney, Agent, or Firm* — Novak Druce Connolly Bove + Quigg LLP

(57) ABSTRACT

A photoelectric converter for optical signals includes a laser diode for emitting the optical signals, an optical transmission module for transmitting the optical signals, and a photo diode for converting the optical signals to electrical signals. The optical transmission module includes lenses oriented at ninety degrees from each other, with total internal reflection between the lenses, and optical fibers coupled with the lenses. The photoelectric converter has a high coupling precision between the lenses and the optical fibers, and the loss of optical signals is minimized.

1 Claim, 4 Drawing Sheets

PHOTOELECTRIC CONVERTER

BACKGROUND

1. Technical Field

The present disclosure relates generally to photoelectric conversion, especially to a photoelectric converter.

2. Description of Related Art

A photoelectric converter may include a laser diode for emitting optical signals, a first optical transmission assembly, a second optical transmission assembly coupled with the first optical transmission assembly, and a photo diode. The optical signals emitted from the laser diode can enter the first optical transmission assembly, and be transmitted through the second optical transmission assembly to the photo diode, and finally can be converted into electrical signals by the photo diode.

The first optical transmission assembly includes a plurality of lenses and the second optical assembly includes a plurality of optical fibers for coupling the lenses with the optical fibers to allow optimum signal transmittance. The first optical transmission assembly has to be mechanically and precisely engaged and configured with the second optical transmission assembly via a plurality of positioning holes and positioning posts to ensure the lenses are precisely aligned with the optical fibers. However, the alignment between the positioning holes and the positioning posts is difficult to achieve consistently, which may result in lowered coupling precision between the lenses and the optical fibers, and result in poor optical signals transmittance.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
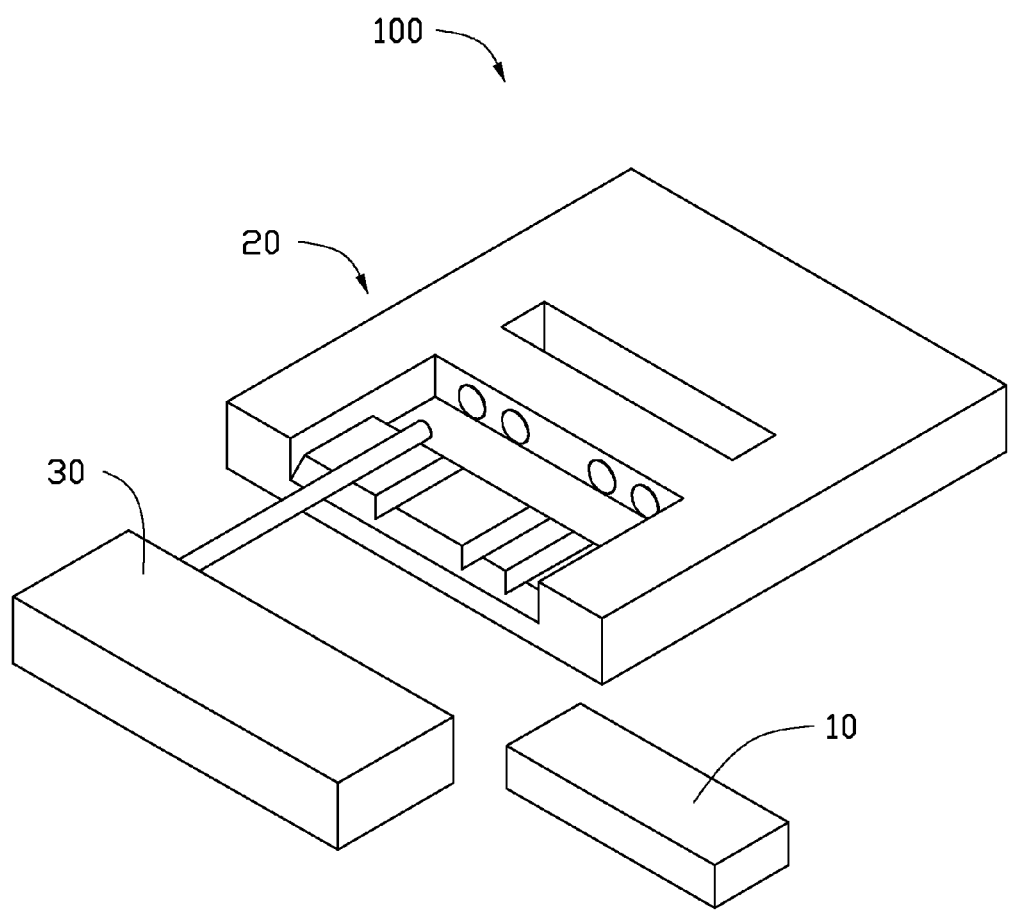
FIG. 1 is an isometric view of one embodiment of a photoelectric converter including an optical transmission module.

Referring to FIG. 1, one embodiment of a photoelectric converter 100, configured for transmitting and converting a plurality of optical signals, includes a laser diode 10 for emitting the optical signals, an optical transmission module 20 for transmitting the optical signals, and a photo diode 30 for converting the optical signals to electrical signals. However, for simplicity, only the objects related to the optical transmission module 20 are described herein.

Figure 2:
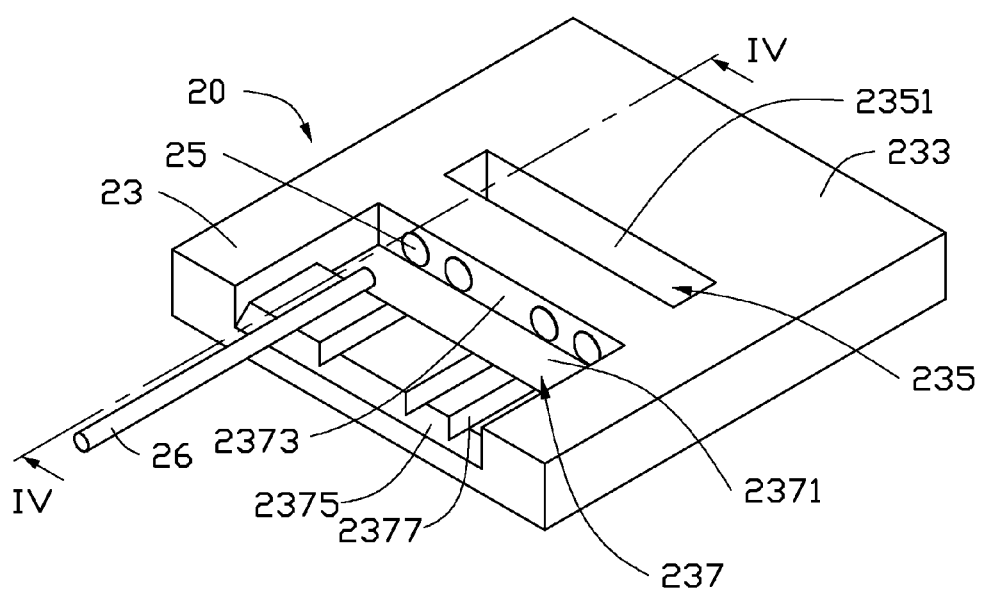
FIG. 2 is an isometric view of the optical transmission module of FIG. 1.
Figure 3:
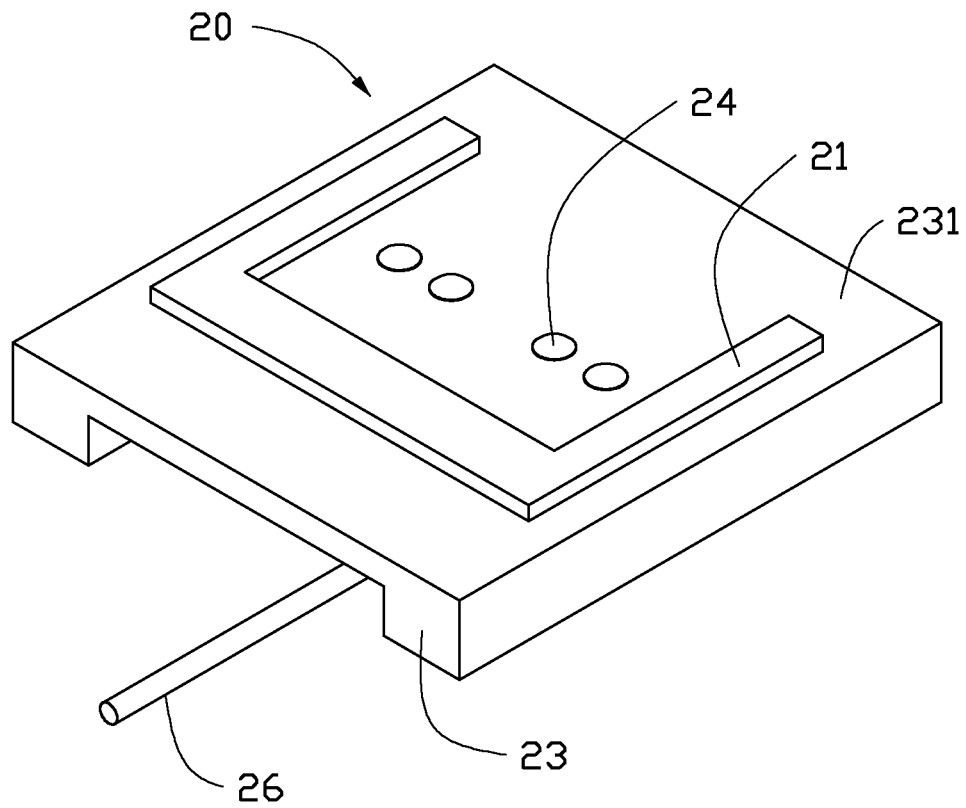
FIG. 3 is similar to FIG. 2, but viewed from another aspect.

Referring to FIGS. 2 and 3, the optical transmission module 20 includes a supporter 21, an optical transmission body 23, a plurality of first lenses 24, a plurality of second lenses 25, and a plurality of optical fibers 26. The first lenses 24 and the second lenses 25 are integrally formed with the optical transmission body 23, and the optical fibers 26 are inserted in the optical transmission body 23. The supporter 21 is formed on a bottom of the optical transmission body 23 for supporting the optical transmission body 23 over the laser diode 10, and then the optical transmission body 23 can receive and transmit the optical signals emitted from the laser diode 10.

Figure 4:
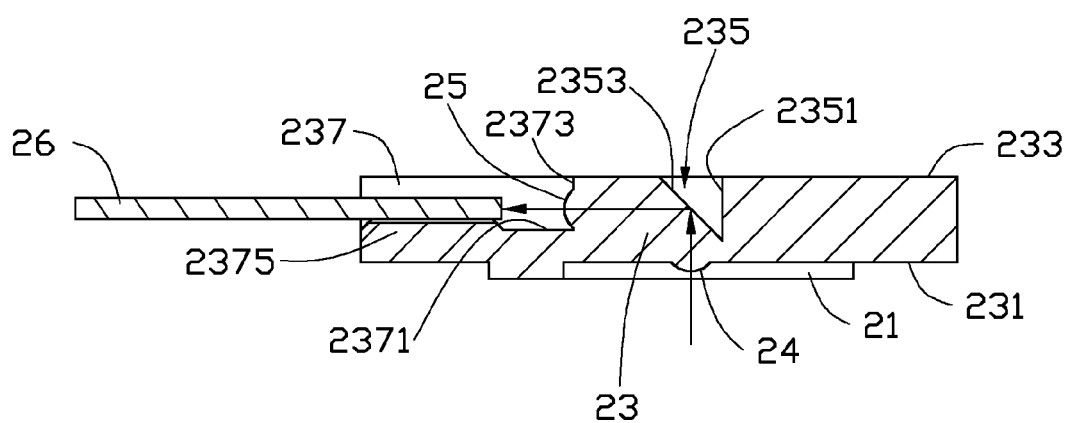
FIG. 4 is a sectional view taken along line IV-IV of the optical transmission module of FIG. 2.

Referring to FIG. 4, the optical transmission body 23 is substantially cuboid and includes a first surface 231 connected with the supporter 21 and a second surface 233 facing opposite from the first surface 231. The first lenses 24, which are aspherical and convex, are integrally formed and arranged in a line on the first surface 231. Optical signals emitted by the laser diode 10 are gathered and converged by the first lenses 24.

The second surface 233 defines a reflection notch 235 and a recess 237. The reflection notch 235 is located at a middle of the second surface 233 corresponding to the line in which the first lenses 24 are arranged along. The reflection notch 235 is substantially a long groove or notch, triangular in cross-section across the width of the groove or notch as shown in FIG. 4, and includes a first side surface 2351 and a second side surface 2353 connecting to the first side surface 2351. The first side surface 2351 is substantially perpendicular to the first surface 231, and an included angle between the first side surface 2351 and the second side surface 2353 is formed such that the optical signals converged from the first lenses 24 undergo a total-internal reflection onto the second side surface 2353, and the included angle is optimized to achieve this described function. That is, the second side surface 2353 is configured for total-internal reflecting and directing the optical signals internally. In the illustrated embodiment, the optical transmission body 23 is made of high refractive material, and the included angle between the first side surface 2351 and the second side surface 2353 is 45°.

The recess 237 is substantially cuboid, and is located near the second side surface 2353. The recess 237 includes a bottom surface 2371 and a side surface 2373 facing opposite from the second side surface 2353. The second lenses 25, which are also aspherical and convex, are formed on the side surface 2373 arranged in a line corresponding to the first lenses 24. Optical signals reflected by the second side surface 2353 are converged by the second lenses 25. In the illustrated embodiment, the side surface 2373 is parallel to the first side surface 2351.

A block 2375 protrudes out from the bottom surface 2371, and is located at a side of the bottom surface 2371 away from the side surface 2373. The block 2375 defines a plurality of V-section grooves 2377 on a surface of the block 2375 adjacent to the bottom surface 2371. The optical fibers 26 are received in the grooves 2377, and affixed to the grooves 2377 via adhesive (not shown) or other appropriate means. An end surface of each optical fiber 26 facing each of the second lenses 25 is precisely located at a focal point of one second lens 25 to which the end surface of an optical fiber 26 is exposed. Therefore, the optical fibers 26 are precisely coupled with the lenses 25, respectively, for transmitting optical signals, and thus signal loss is minimized. The grooves 2377 may be in any other shape in cross-section, for example trapezoid, so long as the optical fibers 26 can be received and secured therein.

In the illustrated embodiment, providing that the second side surface 2353 is in place and functioning, a plurality of intersections of the optical axis of the second lenses 25 and the optical axis of the corresponding first lenses 24 are configured and arranged in a straight line in all respects. The number of the first lenses 24 is four and that of the second lenses 25 is four.

In using the photoelectric converter 100, the laser diode 10 emits optical signals towards the optical transmission module 20. The optical signals are converged by the first lenses 24 and enter into the optical transmission body 23, and are reflected by the second side surface 2353 towards the second lenses 25; the optical signals are then converged by the second lenses 25 onto the optical fibers 26. The optical fibers 26 output the optical signals to the photo diode 30 for the conversion to electrical signals.

The coating of the second side surface 2353 with a reflecting film or the mounting thereon of a reflecting mirror ensures the total internal reflection of the optical signals by the second side surface 2353.

In the photoelectric converter 100, since the optical transmission body 23 defines the recess 237 in which the optical fibers 26 are fixed into, and the design and manufacture of the optical transmission body 23 allows the optical fibers 26 to be received and fixed in the grooves 2377 of the block 2375 so as to be precisely coupled with the second lenses 25. The photoelectric converter 100 has a high coupling precision between the second lenses 25 and the optical fibers 26, and the loss of signals under normal working conditions is thereby insignificant.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An optical transmission module for transmitting optical signals, comprising:
    an optical transmission body;
    a supporter positioned on a bottom of the optical transmission body;
    a plurality of first lenses;
    a plurality of second lenses; and
    a plurality of optical fibers,
    wherein the optical transmission body comprises a first surface and a second surface facing opposite from the first surface, the second surface is substantially parallel to the first surface, the plurality of the first lenses are formed on the first surface, and the second surface defines a recess therein; the recess comprises a side surface, and the plurality of the second lenses are formed on the side surface, and a plurality of intersections of the optical axis of the plurality of second lenses and the optical axis of the corresponding one of the plurality of first lenses are arranged in a straight line; the plurality of the optical fibers are fixed in the recess for coupling with the plurality of the second lens;
    wherein the second surface of the optical transmission body further defines a reflection notch comprising a first side surface and a second side surface connecting to the first side surface, and the optical signals are total internal reflected by the second side surface;
    wherein the recess is defined near the second side surface, and the side surface of the recess faces opposite from the second side surface, the recess further comprising a bottom surface connecting with the side surface;
    wherein a block protrudes from the bottom surface and defines a plurality of grooves on a surface of the block adjacent to the bottom surface, each of the plurality of grooves receiving and fixing an end of a corresponding one of the plurality of optical fibers therein; and
    wherein the plurality of the grooves are V shaped.

* * * * *